United States Patent
Kim et al.

(10) Patent No.: US 9,891,491 B2
(45) Date of Patent: Feb. 13, 2018

(54) LIQUID CRYSTAL DISPLAY DEVICE

(71) Applicant: SAMSUNG DISPLAY CO., LTD., Yongin-si, Gyeonggi-Do (KR)

(72) Inventors: Jaewon Kim, Asan-si (KR); Seonkyoon Mok, Hwaseong-si (KR); Kyunghoe Lee, Seoul (KR); Seongyoung Lee, Hwaseong-si (KR); Yoomi Ra, Ansan-si (KR)

(73) Assignee: Samsung Display Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 14/926,505

(22) Filed: Oct. 29, 2015

(65) Prior Publication Data
US 2016/0282691 A1    Sep. 29, 2016

(30) Foreign Application Priority Data
Mar. 25, 2015    (KR) .................. 10-2015-0041608

(51) Int. Cl.
G02F 1/136    (2006.01)
G02F 1/1362    (2006.01)
G02F 1/1343    (2006.01)

(52) U.S. Cl.
CPC .... *G02F 1/136286* (2013.01); *G02F 1/13624* (2013.01); *G02F 1/134309* (2013.01); *G02F 2001/13606* (2013.01); *G02F 2001/134345* (2013.01)

(58) Field of Classification Search
CPC ............ G02F 1/1368; G02F 1/136227; G02F 1/136286; G02F 1/13624; G02F 1/134309; G02F 2001/134345; G02F 2001/13606

USPC .......................................................... 349/43
See application file for complete search history.

(56) References Cited

U.S. PATENT DOCUMENTS

| | | | | |
|---|---|---|---|---|
| 2012/0086895 | A1* | 4/2012 | Lee | G02F 1/133512 349/106 |
| 2012/0293736 | A1* | 11/2012 | Jung | G09G 3/2074 349/37 |
| 2013/0057813 | A1* | 3/2013 | Jeong | G02F 1/134309 349/110 |

(Continued)

FOREIGN PATENT DOCUMENTS

| | | |
|---|---|---|
| KR | 10-2010-0052645 A | 5/2010 |
| KR | 10-2011-0084707 A | 7/2011 |
| KR | 10-2013-0027370 A | 3/2013 |

*Primary Examiner* — Nathanael R Briggs
*Assistant Examiner* — William Peterson
(74) *Attorney, Agent, or Firm* — Lee & Morse, P.C.

(57) ABSTRACT

A liquid crystal display device has a liquid crystal layer between first and second substrates, a gate line and a data line on the first substrate, a first sub-pixel electrode in a first sub-pixel region of the first substrate, a first transistor connected to the gate line, the data line, and the first sub-pixel electrode, and a second sub-pixel electrode in a second sub-pixel region of the first substrate. The device further includes a second transistor connected to the gate line, the first transistor, and the second sub-pixel electrode, a first storage line extending along an edge portion of the first sub-pixel electrode, a third transistor connected to the gate line, the second sub-pixel electrode, and the first storage line, and a second storage line extending along a side of the second sub-pixel electrode, The second storage line is separated from the first storage line.

15 Claims, 7 Drawing Sheets

(56) References Cited

U.S. PATENT DOCUMENTS

2014/0100150 A1  4/2014  Vinci et al.

* cited by examiner

LIQUID CRYSTAL DISPLAY DEVICE

CROSS-REFERENCE TO RELATED APPLICATION

Korean Patent Application No. 10-2015-0041608, filed on Mar. 25, 2015, and entitled, "Liquid Crystal Display Device," is incorporated by reference herein in its entirety.

BACKGROUND

1. Field

One or more embodiments herein relate to a liquid crystal display device.

2. Description of the Related Art

A liquid crystal display (LCD) has a liquid crystal layer between substrates that include electrodes. When a voltage is applied to the electrodes, liquid crystal molecules in the liquid crystal layer are rearranged and the amount of light transmitted through the layer from a backlight is controlled.

In an attempt to improve visibility, each pixel may include two sub-pixel electrodes for receiving data signals of different levels. The data signal applied to one of the two sub-pixel electrodes is performed without modulation, and data signal is divided and applied to the other electrode. However, a device of this type may experience image sticking and flickering.

SUMMARY

In accordance with one or more embodiments, a liquid crystal display device includes a first substrate opposing a second substrate: a liquid crystal layer between the first and second substrates; a gate line and a data line on the first substrate; a first sub-pixel electrode in a first sub-pixel region of the first substrate; a first transistor connected to the gate line, the data line, and the first sub-pixel electrode; a second sub-pixel electrode in a second sub-pixel region of the first substrate; a second transistor connected to the gate line, the first transistor, and the second sub-pixel electrode; a first storage line extending along an edge portion of the first sub-pixel electrode; a third transistor connected to the gate line, the second sub-pixel electrode, and the first storage line; and a second storage line extending along a side of the second sub-pixel electrode, the second storage line being separated from the first storage line.

Different voltage levels of storage voltages may be applied to the first storage line and the second storage line, respectively. A voltage having a voltage level greater than the storage voltage may be applied to the second storage line is to be applied to the first storage line. The first storage line may overlap the first sub-pixel electrode overlap. The first storage line may enclose the first sub-pixel electrode. The second sub-pixel electrode may include an elongation electrode overlapping the second storage line.

The LCD device may include an auxiliary electrode on a connection portion between the first sub-pixel electrode and the first transistor, wherein the auxiliary electrode is on a same layer as the gate line. An overlapping area between the second sub-pixel electrode and the second storage line may be greater than an overlapping area between the first sub-pixel electrode and the auxiliary electrode. The auxiliary electrode may have substantially an island shape.

The LCD device may include a third storage line extending along another side of the second sub-pixel electrode. The third storage line may be separated from the first storage line. Storage voltages having substantially a same voltage level may be applied to the third storage line and the first storage line, respectively. The third storage line may overlap the second sub-pixel electrode.

The LCD device may include a protection line on the data line and connected to the first storage line. The first sub-pixel electrode may include a planar electrode; and a plurality of branch electrodes extending from the planar electrode. The LCD device may include a common electrode on the second substrate corresponding to the planar electrode. The common electrode may have substantially a cross shape.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
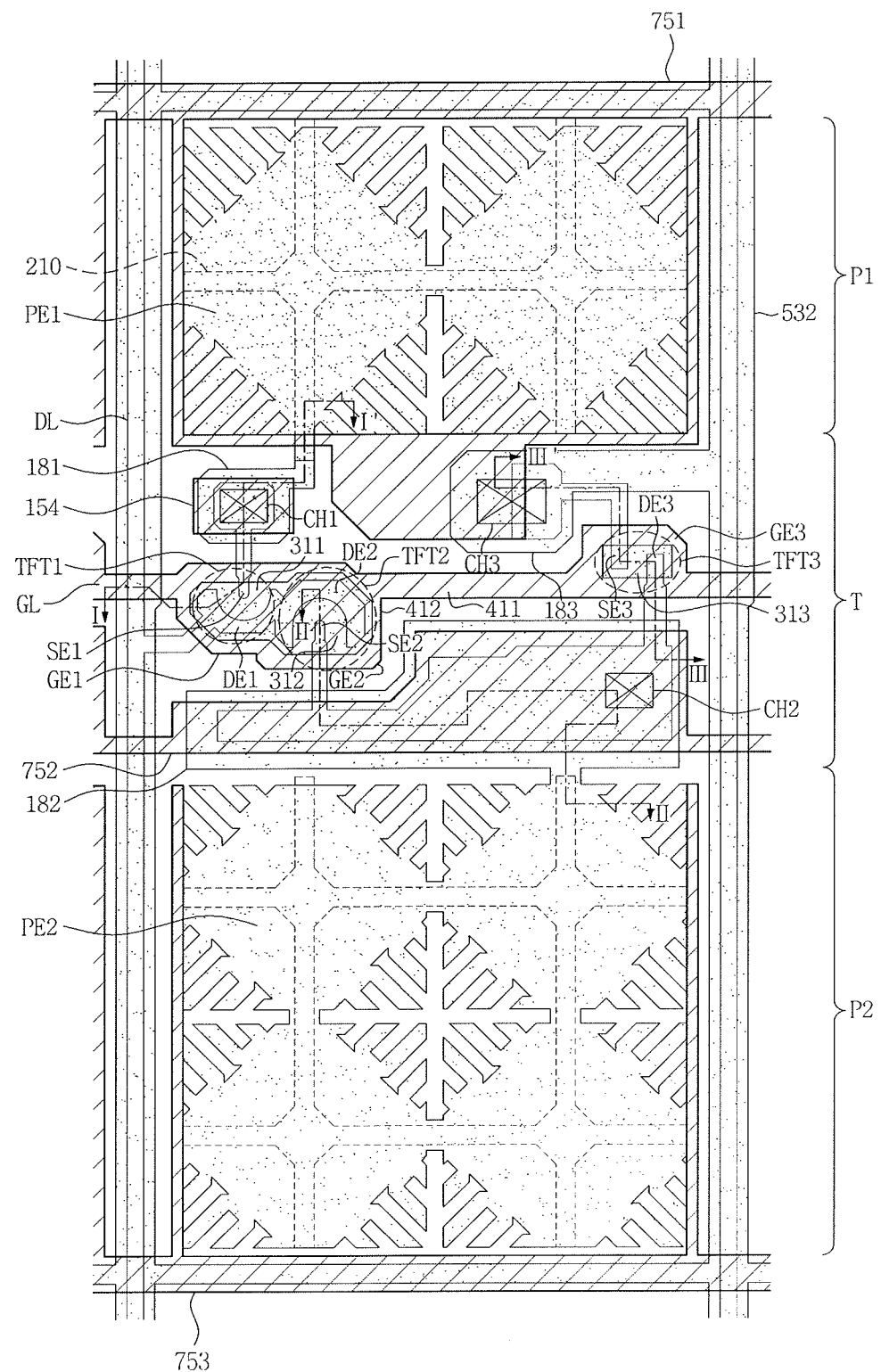
FIG. 1 illustrates an embodiment of a pixel.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Figure 2:
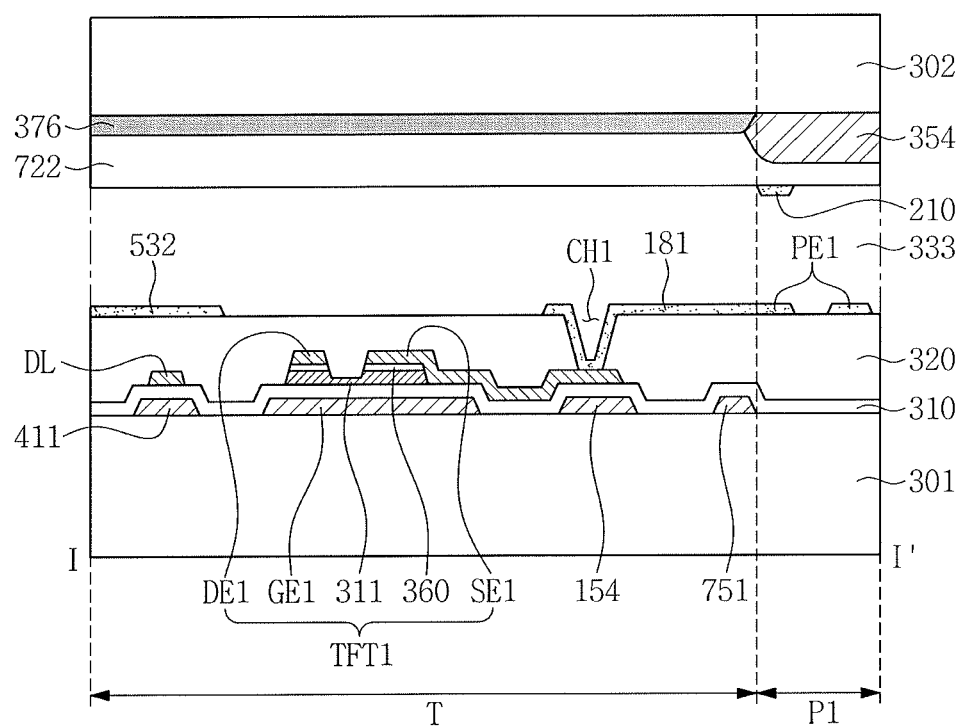
FIG. 2 illustrates a view along section line I-I' in FIG. 1.
Figure 3:
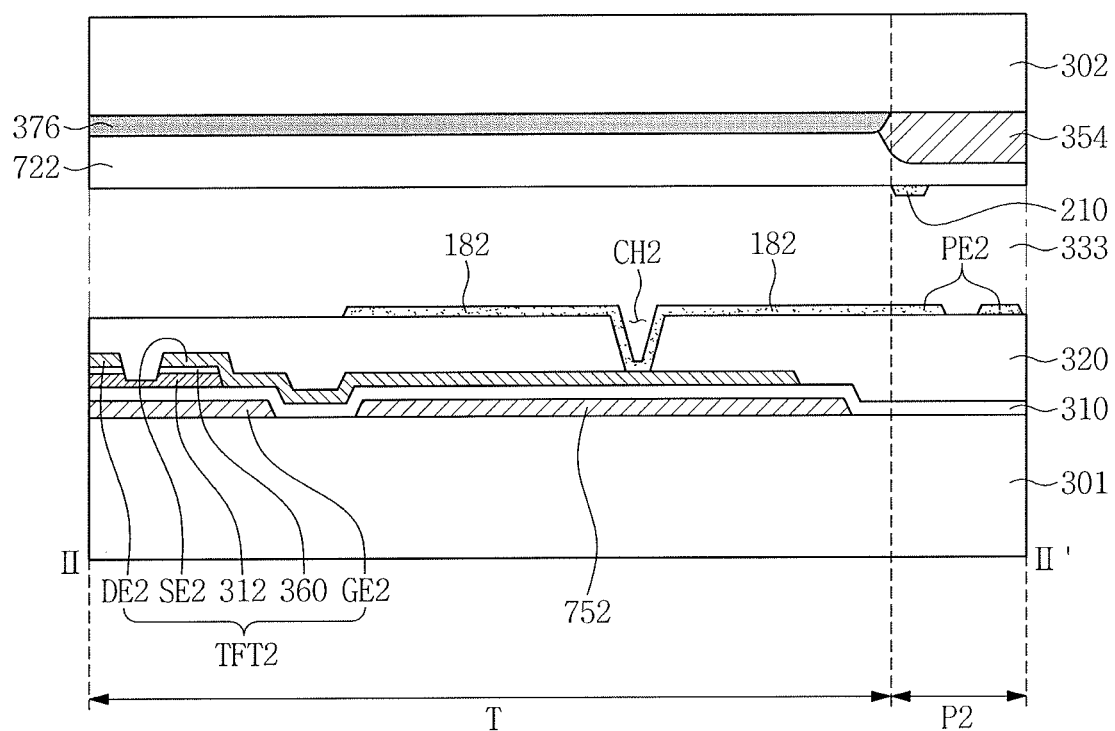
FIG. 3 illustrates a view along section line II-II' in FIG. 1.
Figure 4:
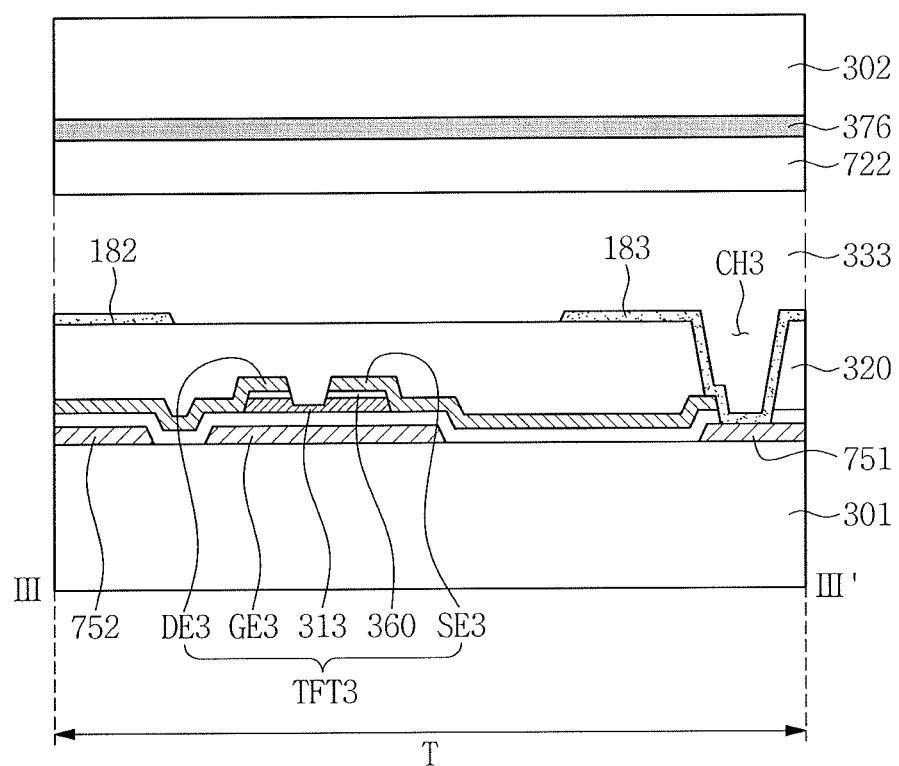
FIG. 4 illustrates a view along section line III-III' in FIG. 1.

FIG. 1 illustrates an embodiment of a pixel, FIG. 2 is a cross-sectional view taken along line I-I' in FIG. 1, FIG. 3 is a cross-sectional view taken along line II-II' in FIG. 1, and FIG. 4 is a cross-sectional view taken along line III-III' in FIG. 1.

Referring to FIGS. 1 to 4, the pixel includes a first thin film transistor TFT1, a second thin film transistor TFT2, a third thin film transistor TFT3, a first storage line 751, a second storage line 752, a third storage line 753, an auxiliary electrode 154, a color filter 354, a first sub-pixel electrode PE1, a first elongation electrode 181, a second sub-pixel electrode PE2, a second elongation electrode 182, a protection line 532, a third elongation electrode 183, a common electrode 330, and a liquid crystal layer 333.

The first thin film transistor TFT1 may include a first gate electrode GE1, a first semiconductor layer 311, a first drain electrode DE1, and a first source electrode SE1. The second thin film transistor TFT2 includes a second gate electrode GE2, a second semiconductor layer 312, a second drain electrode DE2, and a second source electrode SE2. The third thin film transistor TFT3 includes a third gate electrode GE3, a third semiconductor layer 313, a third drain electrode DE3, and a third source electrode SE3.

The gate line GL is on a first substrate 301. For example, the gate line GL may be in a transistor region T of the first substrate 301. The transistor region T may be between a first sub-pixel region P1 and a second sub-pixel region P2.

Figure 5:
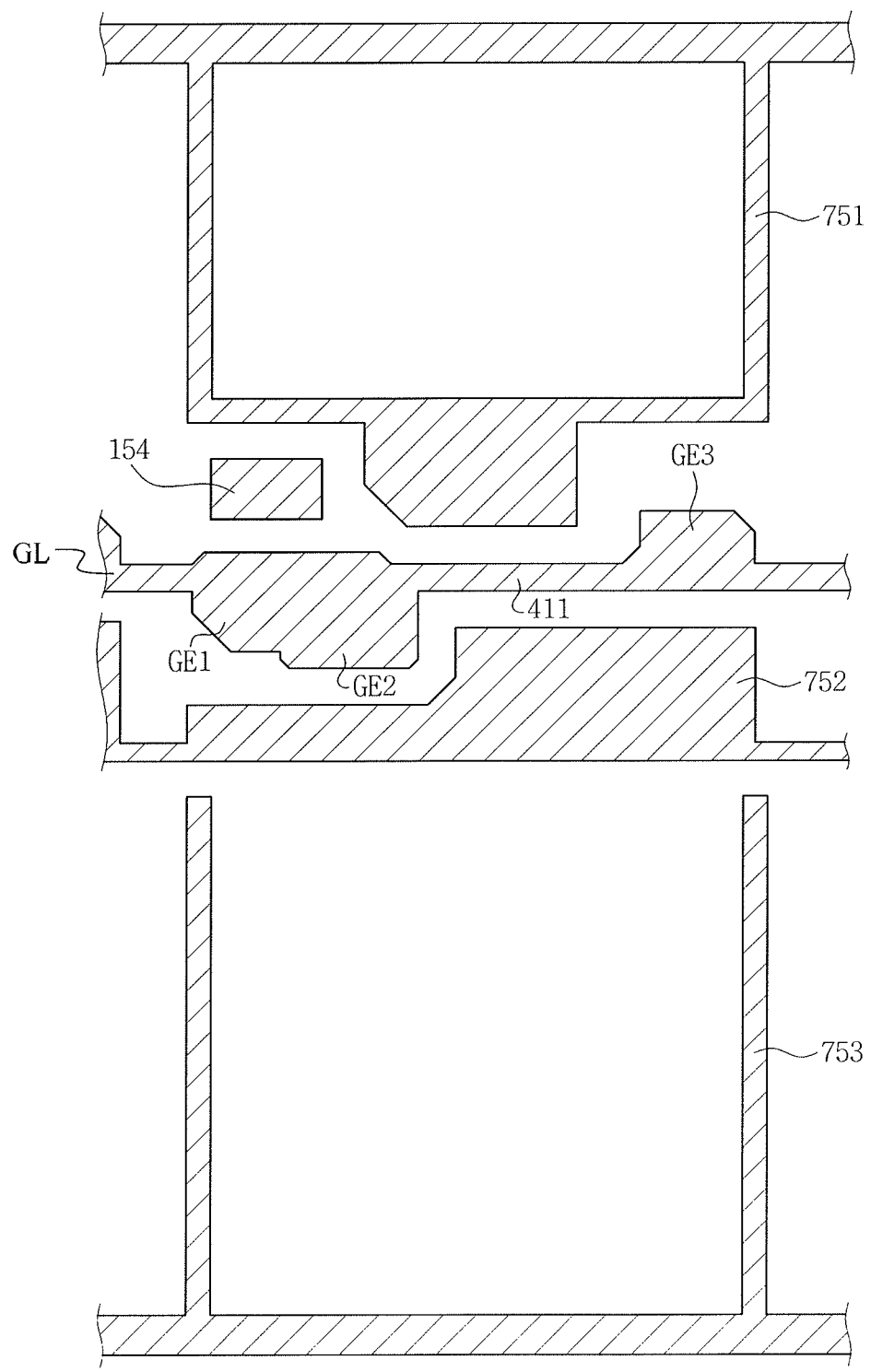
FIG. 5 illustrates examples a first storage line, a gate line, a second storage line, a third storage line, and an auxiliary electrode.

FIG. 5 illustrates examples of the first storage line 751, the gate line GL, the second storage line 752, the third storage line 753 and auxiliary electrode 154 of FIG. 1. Referring to FIGS. 1 to 5, the gate line GL includes a line portion 411 and an electrode portion 412h having different line widths. For example, the electrode portion 412 may have a greater line width than that of the line portion 411. The line portion 411 and the electrode portion 412 may be integrally formed. The electrode portion 412 may include the aforementioned first, second, and third gate electrodes GE1, GE2, and GE3.

The gate line GL may have a connecting portion (e.g., an end portion) having a size greater than other portions, for example, so as to allow for connection to another layer or external driving circuits. The gate line GL includes at least one metal of aluminum (Al) or alloys thereof, silver (Ag) or alloys thereof, copper (Cu) or alloys thereof, and/or molybdenum (Mo) or alloys thereof. Further, the gate line GL may include one of chromium (Cr), tantalum (Ta), and titanium (Ti). In some embodiments, the gate line GL may have a multi-layer structure including at least two conductive layers having different physical properties.

The first storage line 751 is on the first substrate 301. For example, the first storage line 751 may be in the transistor region T of the first substrate 301. The first storage line 751 may extend along at least a side of the first sub-pixel electrode PE1. For example, as illustrated in FIGS. 1 and 5, the first storage line 751 may have a shape enclosing the first sub-pixel electrode PE1. In this case, the first storage line 751 and the first sub-pixel electrode PE1 may overlap each other, but may not overlap each other in another embodiment. When the first storage line 751 and the first sub-pixel electrode PE1 overlap each other, a portion of the first storage line 751 may overlap at least a side of the first sub-pixel electrode PE1.

The first storage line 751 may externally receive a first storage voltage, e.g., a direct current (DC) voltage. The first storage line 751 may include the same material and have the same structure (e.g., a multi-layer structure) as gate line GL. Thus, the gate line GL and the first storage line 751 may be simultaneously formed in the same process.

The second storage line 752 is on the first substrate 301. For example, the second storage line 752 may be in the transistor region T of the first substrate 301. The second storage line 752 may extend along at least a side of the second sub-pixel electrode PE2. For example, as illustrated in FIGS. 1 and 5, the second storage line 752 may be adjacent to at least a side of the second sub-pixel electrode PE2. In this case, the second storage line 752 and the second sub-pixel electrode PE2 may overlap each other, but may not overlap each other in another embodiment. When the second storage line 752 and the second sub-pixel electrode PE2 overlap each other, a portion of the second storage line 752 may overlap at least a side of the second sub-pixel electrode PE2.

The second storage line 752 and the first storage line 751 may not be connected to each other, e.g., the second storage line 752 and the first storage line 751 may be separated from each other. The second storage line 752 may externally receive a second storage voltage. The second storage voltage may have a voltage level different from the first storage voltage. For example, the second storage voltage may be a DC voltage having a voltage level greater than or less than the first storage voltage.

When the second storage voltage has a voltage level less than the first storage voltage, the image sticking on the LCD device may be reduced or eliminated. In addition, when the second storage voltage is higher than the first storage voltage, the flickering phenomenon on the LCD device may be reduced or eliminated.

Considering that the first storage line 751 is connected to the protection line 532, the second storage voltage may be adjusted in a state where the first storage voltage is fixed to a constant value. For example, the voltage level of the first storage voltage may have a constant value, and the second storage voltage may change to have a voltage level greater than or more than the first storage voltage.

The second storage line 752 may include the same material and have the same structure (e.g., a multi-layer structure) as the gate line GL. Thus, the gate line GL and the second storage line 752 may be simultaneously formed in the same process.

The third storage line 753 is on the first substrate 301. For example, the third storage line 753 may be in the transistor region T of the first substrate 301. The third storage line 753 may extend along an edge portion of the second sub-pixel electrode PE2. For example, as illustrated in FIGS. 1 and 5, the third storage line 753 may be adjacent to three edge portions of the second sub-pixel electrode PE2. The third storage line 753 may have a shape enclosing the second sub-pixel electrode PE2, along with the second storage line 752. In this case, the third storage line 753 and the second sub-pixel electrode PE2 may overlap each other, but may not overlap each other in another embodiment. When the third storage line 753 and the second sub-pixel electrode PE2 overlap each other, a portion of the third storage line 753 may overlap an edge portion of the second sub-pixel electrode PE2.

The third storage line 753 may receive a third storage voltage from an external source. The third voltage may have, for example, a voltage level equivalent to the first storage voltage. The third storage line 753 and the first storage line 751 may be connected to each other, but may not be connected to each other in another embodiment. The third storage line 753 may include the same material and have the same structure (e.g., multi-layer structure) as those of the gate line GL. Thus, the gate line GL and the third storage line 753 may be simultaneously formed in the same process.

The auxiliary electrode 154 is on the first substrate 301. For example, the auxiliary electrode 154 may be in the transistor region T of the first substrate 301. The auxiliary electrode 154 does not receive any signal and is not connected to a signal line in the display device. Thus, the auxiliary electrode 154 may be in an electrically floating state. The auxiliary electrode 154 may have, for example, an island shape which is not connected to any of the signal lines or electrodes (e.g., is not connected to the gate line GL, the first gate electrode GE1, the second gate electrode GE2, the third gate electrode GE3, the data line DL, the first source electrode SE1, the second source electrode SE2, the third source electrode SE3, the first drain electrode DE1, the second drain electrode DE2, the third drain electrode DE3, the first sub-pixel electrode PE1, the second sub-pixel electrode PE2, the first storage line 751, the second storage line 752, and the third storage line 753).

The auxiliary electrode 154 prevents irradiation of light emitted from a backlight onto a semiconductor layer, when the semiconductor layer and an ohmic contact layer are below the first source electrode SE1. In one embodiment, the auxiliary electrode 154 may be omitted in the LCD.

A gate insulating layer 310 is on the gate line GL, the first storage line 751, the second storage line 752, the third storage line 753, and the auxiliary electrode 154. In this case, the gate insulating layer 310 may be formed over the entire surface of the first substrate 301 including the first storage line 751, the second storage line 752, the third storage line 753, and the auxiliary electrode 154. The gate insulating layer 310 may be formed of, for example, silicon nitride ($SiN_x$), silicon oxide ($SiO_x$), and the like. The gate insulating layer 310 may have a multi-layer structure including at least two insulating layers having different physical properties.

The first, second, and third semiconductor layers 311, 312, and 313 are on the gate insulating layer 310. The first semiconductor layer 311 may overlap the first gate electrode GE1, the second semiconductor layer 312 may overlap the second gate electrode GE2, and the third semiconductor layer 313 may overlap the third gate electrode GE3. Any combination of the first, second, and third semiconductor layers 311, 312, and 313 may be connected to each other. Referring to FIG. 1, the first semiconductor layer 311 and the second semiconductor layer 312 are connected to each other. The first, second, and third semiconductor layers 311, 312, and 313 may be formed, for example, of amorphous silicon, polycrystalline silicon, or the like.

The ohmic contact layer 360 is on the first, second, and third semiconductor layers 311, 312, and 313. The ohmic contact layer 360 may include, for example, silicide or n+ hydrogenated amorphous silicon doped with n-type impurities, such as phosphorus, at high concentration.

The first drain electrode DE1 and the first source electrode SE1 in the first thin film transistor TFT1, the second drain electrode DE2 and the second source electrode SE2 in the second thin film transistor TFT2, and the third drain electrode DE3 and the third source electrode SE3 in the third thin film transistor TFT3 may be on the ohmic contact layer 360.

As illustrated in FIG. 1, the first drain electrode DE1 may extend from the data line DL to the transistor region T to be disposed on the first gate electrode GE1 and the first semiconductor layer 311. The first drain electrode DE1 may overlap the first gate electrode GE1 and the first semiconductor layer 311. The first drain electrode DE1 may further overlap the line portion 411. The first drain electrode DEI may have a predetermined shape, e.g., a C-shape, an inverted C-shape, a U-shape, or an inverted U-shape. By way of example, FIG. 1 illustrates that the first drain electrode DE1 has a U-shape, and a curved portion of the first drain electrode DE1 may be opposed to the second sub-pixel electrode PE2.

In one embodiment, the first drain electrode DE1 may be made of a refractory metal, such as molybdenum, chromium, tantalum and titanium, or a metal alloy thereof, and may have a multi-layer structure including a refractory metal layer and a low-resistance conductive layer. Examples of the multi-layer structure include: a double-layer structure including a chromium or molybdenum (alloy) lower layer and an aluminum (alloy) upper layer; and a triple-layer structure including a molybdenum (alloy) lower layer, an aluminum (alloy) intermediate layer, and a molybdenum (alloy) upper layer. In one embodiment, the first drain electrode DE1 may be made of one or more metals or conductive materials other than the aforementioned materials.

The first source electrode SE1 is on the first gate electrode GE1 and the first semiconductor layer 311. The first source electrode SE1 may overlap the first gate electrode GE1, the first semiconductor layer 311, and the first elongation electrode 181. The first source electrode SE1 may be connected to the first elongation electrode 181 through a first contact hole CH1. The first source electrode SE1 may overlap the line portion 411.

The first source electrode SE1 may include the same material and have the same structure (multi-layer structure) as the first drain electrode DE1. Thus, the first source electrode SE1 and the first drain electrode DE1 may be simultaneously formed in the same process.

The first gate electrode GE1, the first drain electrode DE1, the first source electrode SE1, the first semiconductor layer 311, and the ohmic contact layer 360 may be used to form the first thin film transistor TFT1. A channel of the first thin film transistor TFT1 may be formed on a portion of the first semiconductor layer 311 between the first drain electrode DE1 and the first source electrode SE1. The portion of the first semiconductor layer 311 corresponding to the channel may have a thickness less than a thickness of other portions. As illustrated in FIG. 1, the first thin film transistor TFT1 may be in the transistor region T.

The second drain electrode DE2 may be electrically connected to the first drain electrode DE1. The second drain electrode DE2 and the first drain electrode DE1 may be integrally formed. The second drain electrode DE2 may be on the second gate electrode GE2 and the second semiconductor layer 312. The second drain electrode DE2 may overlap the second gate electrode GE2 and the second semiconductor layer 312. The second drain electrode DE2 may further overlap the line portion 411. The second drain electrode DE2 may have a predetermined shape, e.g., a C-shape, an inverted C-shape, a U-shape, or an inverted U-shape. By way of example, FIG. 1 illustrates that the second drain electrode DE2 has an inverted U-shape, and a curved portion of the second drain electrode DE2 may be opposed to the second sub-pixel electrode PE2.

The second drain electrode DE2 may include the same material and have the same structure (e.g., multi-layer structure) as the first drain electrode DE1. Thus, the second drain electrode DE2 and the first drain electrode DE1 may be simultaneously formed in the same process.

The second source electrode SE2 is on the second gate electrode GE2 and the second semiconductor layer 312. The second source electrode SE2 may overlap the second gate electrode GE2, the second semiconductor layer 312, and the second elongation electrode 182. The second source electrode SE2 may be connected to the second elongation electrode 182 through a second contact hole CH2. The second source electrode SE2 may further overlap the line portion 411. The second source electrode SE2 may include the same material and have the same structure (e.g., a multi-layer structure) as the first drain electrode DE1. Thus, the second source electrode SE2 and the first drain electrode DE1 may be simultaneously formed in the same process.

The second gate electrode GE2, the second drain electrode DE2, the second source electrode SE2, the second semiconductor layer 312, and the ohmic contact layer 360 may be used to form the second thin film transistor TFT2. A channel of the second thin film transistor TFT2 may be formed on a portion of the second semiconductor layer 312 between the second drain electrode DE2 and the second source electrode SE2. The portion of the second semiconductor layer 312 corresponding to the channel may have a thickness less than a thickness of other portions. As illustrated in FIG. I, the second thin film transistor TFT2 may be in the transistor region T.

The third drain electrode DE3 may be electrically connected to the second source electrode SE2. To this end, the third drain electrode DE3 and the second source electrode SE2 may be integrally formed. The third drain electrode DE3 may be on the third gate electrode GE3 and the third semiconductor layer 313. The third drain electrode DE3 may overlap the third gate electrode GE3, the third semiconductor layer 313, and the second elongation electrode 182. The third drain electrode DE3 may further overlap the line portion 411. The third drain electrode DE3 may include the same material and have the same structure (e.g., multi-layer structure) as those of the first drain electrode DE1. Thus, the third drain electrode DE3 and the first drain electrode DE1 may be simultaneously formed in the same process.

The third source electrode SE3 is on the third gate electrode GE3, the third semiconductor layer 313, and the first storage line 751. The third source electrode SE3 may overlap the third gate electrode GE3, the third semiconductor layer 313, the first storage line 751, and the third elongation electrode 183. The third source electrode SE3 may be connected to the third elongation electrode 183 through a third contact hole CH3. The third source electrode SE3 may further overlap the line portion 411. The third source electrode SE3 may include the same material and have the same structure (e.g., multi-layer structure) as the first drain electrode DE1. Thus, the third source electrode SE3 and the first drain electrode DE1 may be simultaneously formed in the same process.

The third gate electrode GE3, the third drain electrode DE3, the third source electrode SE3, the third semiconductor layer 313, and the ohmic contact layer 360 may be used to form the third thin film transistor TFT3. A channel of the third thin film transistor TFT3 may be formed on a portion of the third semiconductor layer 313 between the third drain electrode DE3 and the third source electrode SE3. The portion of the third semiconductor layer 313 corresponding to the channel may have a thickness less than a thickness of other portions. As illustrated in FIG. 1, the third thin film transistor TFT3, may be in the transistor region T.

The data line DL is on the gate insulating layer 310 and may have a connecting portion (e.g., an end portion) of a size greater than other portions to allow for connection to another layer or external driving circuits.

The data line DL may intersect the gate line GL, the first storage line 751, the second storage line 752, and the third storage line 753. The data line DL may have a smaller line width in a portion where the data line DL intersects the gate line GL rather than a line width of other portions. Likewise, the data line DL may have a smaller line width in a portion where the data line DL intersects one of the first storage line 751, the second storage line 752, and the third storage line 753 rather than a line width of other portions. Accordingly, parasitic capacitance between the data line DL and the gate line GL and capacitance between the data line DL and one of the first storage line 751, the second storage line 752, or the third storage line 753 may decrease. The data line DL may include the same material and have the same structure (e.g., multi-layer structure) as those of the first drain electrode DE1. Thus, the data line DL and the first drain electrode DE1 may be simultaneously formed in the same process.

A semiconductor layer and an ohmic contact layer may be disposed below the data line DL, the first, second and third drain electrodes DE1, DE2, and DE3, and the first, second and third source electrodes SE1, SE2, and SE3.

The protection layer 320 is on the data line DL, the first, second and third drain electrodes DE1, DE2, and DE3, and the first, second and third source electrodes SE1, SE2, and SE3. The protection layer 320 may be formed over the entire surface of the first substrate 301 including the data line DL, the first, second and third drain electrodes DE1, DE2, and DE3, and the first, second and third source electrodes SE1, SE2, and SE3. The protection layer 320 may be configured to eliminate height differences between elements of the first substrate 301, which are disposed between the protection layer 320 and the first substrate 301 such as the data line DL, the first, second and third drain electrodes DE1, DE2, and DE3, and the first, second and third source electrodes SE1, SE2, and SE3. In addition, the protection layer 320 may protect the elements of the first substrate 301.

The protection layer 320 may include, for example, inorganic insulating materials such as silicon nitride ($SiN_x$) and silicon oxide ($SiO_x$). When the protection layer 320 is made of an inorganic insulating material, an inorganic insulating material having photosensitive properties and having a dielectric constant of about 4.0 may be used. The protection layer 320 may have a double-layer structure including a lower inorganic layer and an upper organic layer, which has been found to impart desirable insulating properties and also to prevent damage to exposed portions of the first, second, and third semiconductor layers 311, 312, and 313. For example, the protection layer 320 may have a thickness of greater than or equal to about 5000 Å, or in a range of about 6000 Å to about 8000 Å.

The protection layer 320 may have the first, second, and third contact holes CH1, CH2, and CH3 extending partially therethrough. The first source electrode SE1, the second source electrode SE2, and the third source electrode SE3 may be partially exposed through the first, second, and third contact holes CH1, CH2, and CH3, respectively.

The first sub-pixel electrode PE1 is on the protection layer 320. For example, the first sub-pixel electrode PE1 may be on the protection layer 320 in the first sub-pixel region P1.

Figure 6:
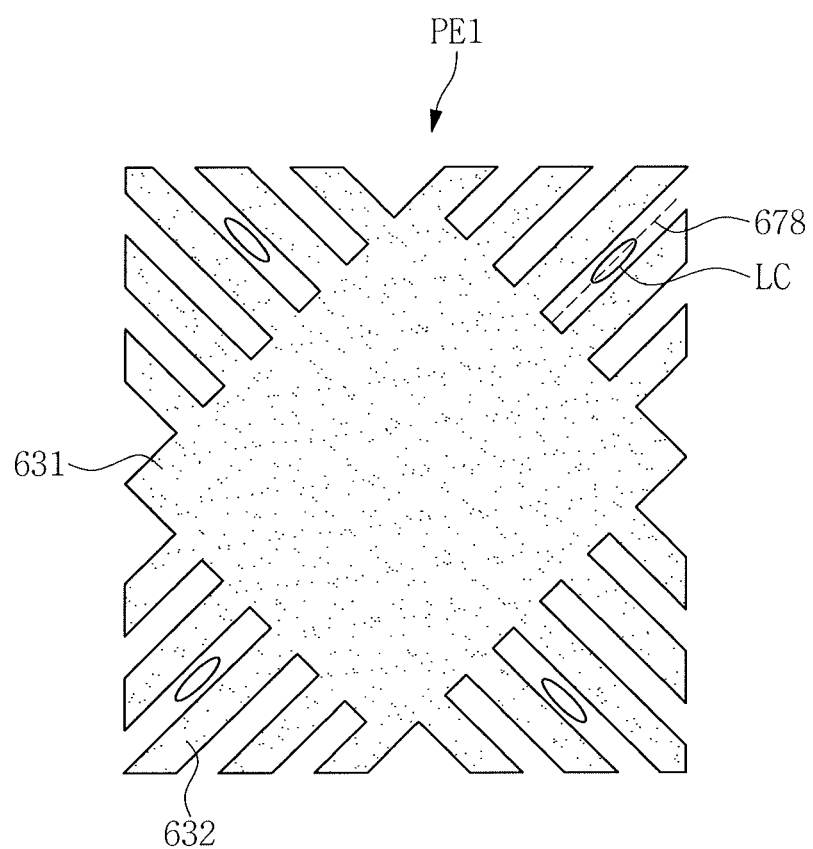
FIG. 6 illustrates an example of a first sub-pixel electrode of FIG. 1.

FIG. 6 illustrates an embodiment of the first sub-pixel electrode PE1 in FIG. 1. Referring to FIGS. 1 and 6, the first sub-pixel electrode PE1 includes a planar electrode 631 and a plurality of branch electrodes 632. The planar electrode 631 may have, for example, a lozenge shape. The branch electrodes 632 may extend from the planar electrode 631. For example, the branch electrodes 632 may extend from respective sides of the planar electrode 631 in a diagonal direction. In this regard, the branch electrodes 632 may extend along directions perpendicular to each corresponding side thereof, respectively. A space between adjacent branch electrodes 632 is defined as a slit, and a direction of a major axis 678 of liquid crystals LC is determined based on the slit. Thus, the major axis 678 of the liquid crystals LC may correspond to a longitudinal direction of the slit.

As illustrated in FIG. 1, each pixel may include a plurality of first sub-pixel electrodes PE1 and the plurality of first sub-pixel electrodes PE1 may be connected to each other. For example, the first sub-pixel electrodes PE1 may be integrally formed. The first sub-pixel electrode PE1 may include a transparent conductive material such as indium tin oxide (ITO) or indium zinc oxide (IZO). ITO may be a polycrystalline or monocrystalline material, and IZO may be a polycrystalline or monocrystalline material.

The first sub-pixel electrode PE1 may include the first elongation electrode 181 disposed on the protection layer 320. For example, the first elongation electrode 181 may be on the protection layer 320 in the transistor region T. The first elongation electrode 181 may extend from the first sub-pixel electrode PE1 toward the transistor region T. The first elongation electrode 181 may be integrally formed with the first sub-pixel electrode PE1. The first elongation electrode 181 may overlap the auxiliary electrode 154 and the first source electrode SE1. The first elongation electrode 181 may be connected to the first source electrode SE1 through the first contact hole CH1. The first elongation electrode 181 may include the same material as that forming the first sub-pixel electrode PE1.

The second sub-pixel electrode PE2 is on the protection layer 320. For example, the second sub-pixel electrode PE2 may be on the protection layer 320 in the second sub-pixel region P2. The second sub-pixel electrode PE2 may include a planar electrode and a plurality of branch electrodes. The second sub-pixel electrode PE2 may be substantially identical to the aforementioned first sub-pixel electrode PE1. The second sub-pixel electrode PE2 may include the same materials as the aforementioned first sub-pixel electrode PE1.

As illustrated in FIG. 1, each pixel may include a plurality of second sub-pixel electrodes PE2 connected to each other. The second sub-pixel electrodes PE2 may be integrally formed. The second elongation electrode 182 is on the protection layer 320. For example, the second elongation electrode 182 is on a portion of the protection layer 320 in the transistor region T. The second elongation electrode 182 may extend from the second sub-pixel electrode PE2 toward the transistor region T. The second elongation electrode 182 may be integrally formed with the second sub-pixel electrode PE2. The second elongation electrode 182 may overlap the second storage line 752 and the second source electrode SE2. The second elongation electrode 182 may be connected to the second source electrode SE2 through the second contact hole CH2.

The second sub-pixel electrode PE2 may further include the second elongation electrode 182, which includes the same material as the first sub-pixel electrode PE1. The second elongation electrode 182 is greater than the first elongation electrode 181.

An overlapping area between the second sub-pixel electrode PE2 and the second storage line 752 may be greater than an overlapping area between the first sub-pixel electrode PE1 and the auxiliary electrode 154. For example, the overlapping area between the second elongation electrode 182 of the second sub-pixel electrode PE2 and the second storage line 752 may be greater than the overlapping area between the first elongation electrode 181 of the first sub-pixel electrode PE1 and auxiliary electrode 154.

The protection line 532 is on the protection layer 320. For example, the protection line 532 may be on the protection layer 320, which is disposed on the data line DL. The protection line 532 may overlap the data line DL and may have a line width greater than the data line DL. The protection line 532 may include the same material as the first sub-pixel electrode PE1.

The protection line 532 may be disposed on the first storage line 751 and the third storage line 753. In this regard, the protection line 532 may further overlap a portion of the first storage line 751 and a portion of the third storage line 753. The protection line 532 may reduce the capacitance between the data line DL and the common electrode 210.

The third elongation electrode 183 is on the protection layer 320. For example, the third elongation electrode 183 may be on a portion of the protection layer 320 in the transistor region T. The third elongation electrode 183 may extend from the protection line 532 toward the transistor region T. The third elongation electrode 183 may be integrally formed with the protection line 532. The third elongation electrode 183 may overlap the first storage line 751 and the third source electrode SE3. The third elongation electrode 183 may be connected to the first storage line 751 and the third source electrode SE3 through the third contact hole CH3. The third elongation electrode 183 may include the same material as the first sub-pixel electrode PE1.

A lower alignment layer may be on the first sub-pixel electrode PE1, the first elongation electrode 181, the second sub-pixel electrode PE2, the second elongation electrode 182, the protection line 532, the third elongation electrode 183, and the protection layer 320. For example, the lower alignment layer may be a homeotropic alignment layer and may be an alignment layer including a photoreactive material.

A black matrix 376 is on the second substrate 302. For example, the black matrix 376 may be disposed on a portion of the second substrate 302 that is different from portions corresponding to the pixel region (e.g., the first sub-pixel region P1 and the second sub-pixel region P2). The black matrix 376 may be on the first substrate 301, rather than on the second substrate 302, in another embodiment.

The color filter 354 is in the pixel region P. The color filters 354 may include, for example, a red color filter, a green color filter, and a blue color filter. The color filter 354 may be on the first substrate 301, rather than on the second substrate 302, in another embodiment.

An overcoat layer 722 is on the black matrix 376 and the color filter 354. The overcoat layer 722 may be disposed over the entire surface of the second substrate 302 including the black matrix 376 and the color filter 354.

The overcoat layer 722 may eliminate height differences between elements of the second substrate 302, which are disposed between the overcoat layer 722 and the second substrate 302, such as the black matrix 376 and the color filter 354. In addition, the overcoat layer 722 may prevent leakage of dyes included in the color filter 354.

The common electrode 210 is on the overcoat layer 722. For example, the common electrode 210 may be on a portion of the overcoat layer 722 in the first sub-pixel region P1 and the second sub-pixel region P2.

Figure 7:
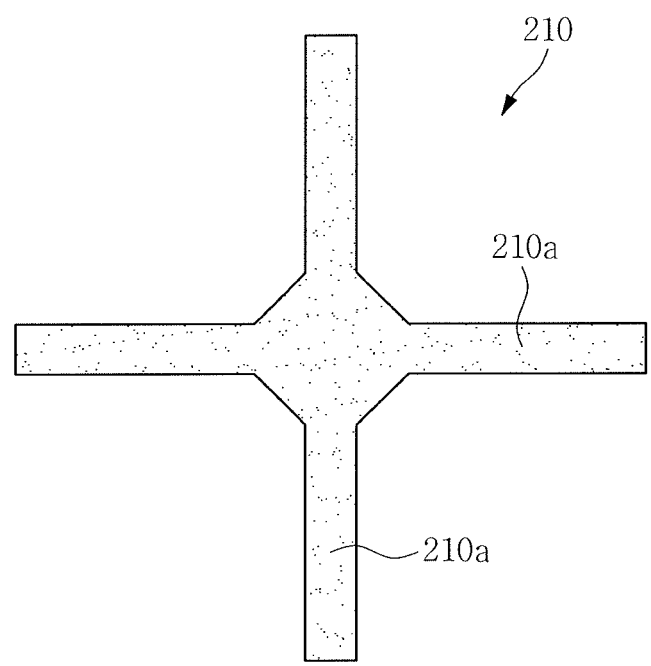
FIG. 7 illustrates an example of a common electrode of FIG. 1.

FIG. 7 illustrates an embodiment of the common electrode 210 of FIG. 1. Referring to FIGS. 1 and 7, the common electrode 210 has a cross shape including a horizontal electrode 210a and a vertical electrode 210b which intersect each other. An intersection portion of the horizontal electrode 210a and the vertical electrode 210b may be disposed in the center of the planar electrode 631.

The pixel may include a plurality of common electrodes 210 connected to each other. The common electrodes 210 may be integrally formed. The common electrode 210 may include the same material as the first sub-pixel electrode PE1.

An upper alignment layer may be disposed on the common electrode 210 and the overcoat layer 722. The upper alignment layer may be a homeotropic alignment layer and may be an alignment layer which is photo-aligned using a photopolymeric material.

The liquid crystal layer 333 is between the first substrate 301 and the second substrate 302. The liquid crystal layer 333 may include a photopolymeric material, e.g., a reactive monomer or a reactive mesogen.

When surfaces of the first substrate 301 and the second substrate 302 that face each other are respectively defined as upper surfaces of the corresponding substrate, and surfaces opposite to the upper surfaces are respectively defined as lower surfaces of the corresponding substrate, an upper polarizer may be on the lower surface of the first substrate 301 and a lower polarizer may be on the lower surface of second substrate 302.

A transmission axis of the upper polarizer may be perpendicular to a transmission axis of the lower polarizer. Thus, one of the transmission axes thereof and the line portion 411 of the gate line GL may be parallel to each other. In one embodiment, the display device may only include one of the upper polarizer or the lower polarizer.

In the display device having the aforementioned configuration, each pixel may operate in the following manner. When a gate signal is applied to the gate line GL, a data voltage transmitted to the data line DL is applied to the first sub-pixel electrode PE1 and the second sub-pixel electrode PE2 via the first thin film transistor TFT1 and the second thin film transistor TFT2, respectively.

The data voltage transmitted through the first thin film transistor TFT1 may be entirely applied to the first sub-pixel electrode PE1, while the data voltage transmitted through the second thin film transistor TFT2 may only be partially applied to the second sub-pixel electrode PE2, due to the third thin film transistor TFT3. Accordingly, the first sub-pixel region P1, in which the first sub-pixel electrode PE1 is disposed, may exhibit a luminance higher than the second sub-pixel region P2 in which the second sub-pixel electrode PE2 is disposed.

For example, when the gate signal is applied to the gate line GL, the data voltage, which is applied to the second drain electrode DE2 of the second thin film transistor TFT2, is applied to the second source electrode SE of the second thin film transistor TFT2 through the channel. A fraction of the data voltage transmitted to the second source electrode SE2 of the second thin film transistor TFT2 may be applied to the second sub-pixel electrode PE2. Another fraction may be directed to the first storage line 751 through the third thin film transistor TFT3. In this regard, the data voltage applied to the second sub-pixel electrode PE2 may be adjusted by varying the voltage applied to the first storage line 751.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A liquid crystal display (LCD) device, comprising:
a first substrate opposing a second substrate;
a liquid crystal layer between the first and second substrates;
a gate line and a data line on the first substrate;
a first sub-pixel electrode in a first sub-pixel region of the first substrate;
a first transistor connected to the gate line, the data line, and the first sub-pixel electrode;
a second sub-pixel electrode in a second sub-pixel region of the first substrate;
a second transistor connected to the gate line, the first transistor, and the second sub-pixel electrode;
a first storage line extending along an edge portion of the first sub-pixel electrode, the first storage line overlapping the first sub-pixel electrode;
a third transistor connected to the gate line, the second sub-pixel electrode, and the first storage line; and
a second storage line extending along a side of the second sub-pixel electrode, the second storage line overlapping the second sub-pixel electrode, the second storage line being separated from the first storage line, wherein the first and second storage lines are to carry voltages of different levels.

2. The LCD device as claimed in claim 1, wherein the first storage line is to carry a voltage greater than a voltage to be carried by the second storage line.

3. The LCD device as claimed in claim 1, wherein the first storage line encloses the first sub-pixel electrode.

4. The LCD device as claimed in claim 1, wherein the second sub-pixel electrode includes an elongation electrode overlapping the second storage line.

5. The LCD device as claimed in claim 1, further comprising:
an auxiliary electrode overlapping a contact hole through which the first sub-pixel is connected with the first transistor, wherein the auxiliary electrode is on a same layer as the gate line.

6. The LCD device as claimed in claim 5, wherein an overlapping area between the second sub-pixel electrode and the second storage line is greater than an overlapping area between the first sub-pixel electrode and the auxiliary electrode.

7. The LCD device as claimed in claim 5, wherein the auxiliary electrode has substantially an island shape, the auxiliary electrode being not connected to any conductor.

8. The LCD device as claimed in claim 1, further comprising:
a third storage line extending along another side of the second sub-pixel electrode.

9. The LCD device as claimed in claim 8, wherein the third storage line is separated from the first storage line.

10. The LCD device as claimed in claim 8, wherein storage voltages having substantially a same voltage level are to be carried by the third storage line and the first storage line, respectively.

11. The LCD device as claimed in claim 8, wherein the third storage line overlaps the second sub-pixel electrode.

12. The LCD device as claimed in claim 1, further comprising:
a protection line on the data line and connected to the first storage line.

13. The LCD device as claimed in claim 1, wherein the first sub-pixel electrode includes:
   a planar electrode; and
   a plurality of branch electrodes extending from the planar electrode.

14. The LCD device as claimed in claim 13, further comprising:
   a common electrode on the second substrate corresponding to the planar electrode.

15. The LCD device as claimed in claim 14, wherein the common electrode has substantially a cross shape.

* * * * *